United States Patent [19]

Kainuma et al.

[11] 4,283,920
[45] Aug. 18, 1981

[54] REFRIGERATING DEVICE

[75] Inventors: Hiroyuki Kainuma, Kumagaya; Yukio Okuda, Fukaya; Yoshiaki Fujisawa, Gyoda, all of Japan

[73] Assignee: Sawafuji Electric Co., Ltd., Tokyo, Japan

[21] Appl. No.: 51,829

[22] Filed: Jun. 25, 1979

[30] Foreign Application Priority Data

Jul. 28, 1978 [JP] Japan ................... 53/92209

[51] Int. Cl.³ .................. F25B 31/02; F04B 49/10
[52] U.S. Cl. ...................... 62/126; 318/473; 417/32; 62/228
[58] Field of Search .............. 62/229, 126, 228 C, 62/227; 361/22; 417/14, 212, 32, 320; 318/473

[56] References Cited

U.S. PATENT DOCUMENTS 3,781,140  12/1973  Gladden ................. 417/326

Primary Examiner—William E. Wayner

[57] ABSTRACT

A refrigerating device having an inverter circuit for generating alternating voltage, a vibrating compressor to which the alternating voltage from the inverter circuit is supplied, a condenser to which the refrigerant compressed by the compressor is supplied, a capillary tube provided on the downstream side of the condenser and an evaporator provided on the downstream side of the capillary tube, wherein a phase control circuit for controlling the phase of the alternating voltage supplied to the compressor in accordance with ambient temperature of the refrigerating device and/or the evaporator temperature is provided to cause the piston stroke of the vibrating compressor to be reduced in accordance with decreases in ambient temperature of the refrigerating device and/or the evaporator temperature so as to prevent unwanted damage to the compressor.

7 Claims, 13 Drawing Figures

REFRIGERATING DEVICE

BACKGROUND OF THE INVENTION

1. Field of the Invention

This invention relates generally to a refrigerating device, and more specifically to a refrigerating device having an inverter circuit for generating alternating voltage and a vibrating compressor driven by the alternating voltage supplied by the inverter circuit wherein the phase of the alternating voltage fed to the compressor is controlled in accordance with ambient temperature of the refrigerating device and/or the evaporator temperature so as to prevent failures such as damage to valve chest due to unwanted compression levels.

2. Description of the Prior Art

In general, a refrigerating device comprises an inverter circuit for generating alternating voltage, a vibrating compressor driven by the alternating voltage supplied by the inverter circuit, a condenser to which the refrigerant compressed by the compressor is supplied, a capillary tube provided on the downstream side of the condenser, an evaporator provided on the downstream side of the capillary tube, etc., and is constructed so that the refrigerant evaporated in the evaporator is returned to the compressor for recompression. In this type of the refrigerating device, however, the piston stroke of the compressor unwantedly increases when the refrigerating device operated at extremely low ambient temperature, causing damage to the valve chest. For instance, when a recreational vehicle (camping car) carrying a refrigerator using this type of refrigerating device is parked on a skiing ground, the refrigerator on board the vehicle is often operated because the temperature within the vehicle is air-conditioned. In such a case, the abovementioned phenomenon often occurs due to low air temperature. This can be explained as follows.

Whereas the refrigerator is operated at room temperature, the condenser connected to the compressor of the refrigerator is exposed to open air temperature, and may be cooled by air temperature as low as −30° C. in extreme cases. As a result, most of the refrigerant is left in liquefied state in the condenser, trickling out little by little to the evaporator. The refrigerant adiabatically expanded there is immediately fed to the condenser by the compressor, bringing the gas pressure in the evaporator and the compressor to a vacuum. This results in an unwanted increase in the piston stroke of the vibrating compressor and eventually in damage to the valve chest.

Needless to say, the vibrating compressor is designed to maintain a resonance between the natural frequency of the mechanical system determined by the elasticity coefficient of refrigerant gas, the spring constant of the resonating spring, etc. and the frequency of the electrical system driving the mechanical system wherever possible. Particularly, a refrigerating device constructed so as to properly maintain a resonance by changing the frequency of the electrical system in accordance with changes in the natural frequency of the mechanical system, as will be described later, tends to suffer directly and sensitively the effect of the abovementioned increase in piston stroke because the electrical system responds with a change in the natural frequency of the mechanical system due to decreased refrigerant gas pressure by changing the frequency of the alternating voltage to maintain the resonance.

SUMMARY OF THE INVENTION

It is an object of this invention to provide a refrigerating device designed to prevent damage to the valve chests due to increased piston stroke in the vibrating compressor when operated at extremely low ambient temperature by reducing the piston stroke of the compressor by controlling the phase of the alternating voltage supplied to the compressor in accordance with decreases in ambient temperature of the refrigerating device and/or evaporator temperature.

It is another object of this invention to provide a refrigerating device designed to reduce loss of electrical energy by employing a circuit configuration for controlling the phase of the alternating voltage and operating transistors and other circuit elements in an on-off mode.

It is still further object of this invention to provide a refrigerating device designed to forcibly bring the device in nonoperating state under a very low temperature operating condition.

DETAILED DESCRIPTION OF THE INVENTION

Figure 1:
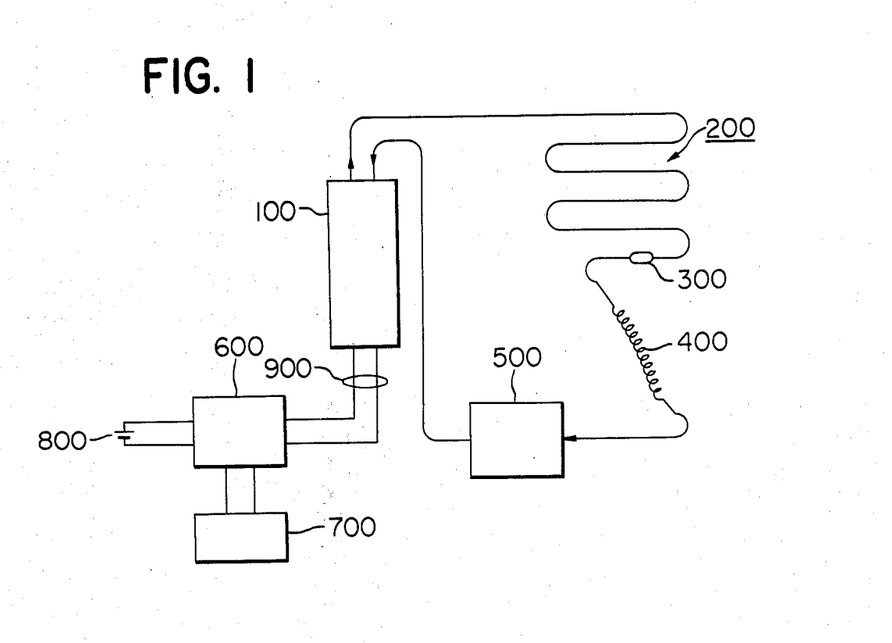
FIG. 1 is an explanatory drawing schematically illustrating a refrigerating device embodying this invention.

In FIG. 1, numeral 100 refers to a vibrating compressor; 200 to a condenser; 300 to a strainer serving as a filter; 400 to a capillary tube; 500 to an evaporator; 600 to an inverter circuit; 700 to a phase control circuit provided according to this invention; 800 to a d-c power supply, for example, a battery on board an automobile; and 900 to lead wires, respectively.

In a recreational vehicle which is parked in an area where a commercial power source is available, for example, the commercial power source is rectified to operate various electrical equipment on board the car and drive the compressor 100 via the inverter circuit 600 while charging the battery 800. In an area where the commercial power source is not available, on the other hand, the battery 800 drives the electrical equipment on board the car and the compressor 100 via the inverter circuit 600. Furthermore, during travelling on the road, the battery 800 is float charged by a generator on board the car, and the compressor 100 is driven by causing the inverter circuit 600 to generate alternating voltage.

The compressor 100 compresses refrigerant gas to supply to the condenser 200 where the refrigerant gas is cooled by the open air and partially liquefied. The refrigerant is passed through the strainer 300 and the capillary tube 400, and adiabatically expanded in the evaporator 500 and returned to the compressor 100 for recompression.

Figure 2:
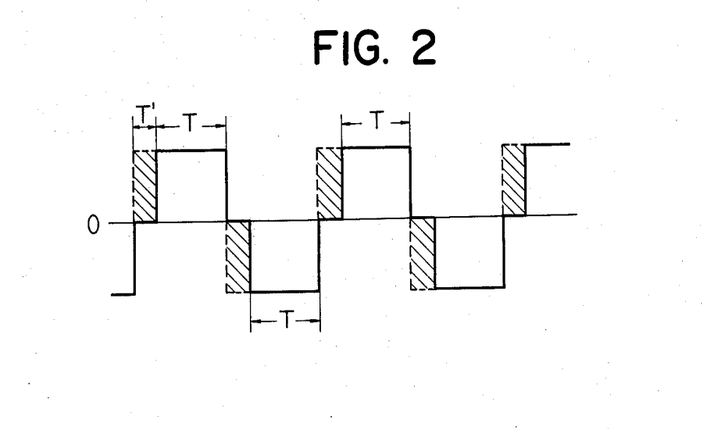
FIGS. 2 and 3(A), (B) and (C) are explanatory drawings illustrating the operation of the refrigerating device shown in FIG. 1.

In this invention, a phase control circuit 700 is provided for controlling the phase of the alternating voltage generated by the inverter circuit 600 and fed to the vibrating compressor 100. For example, when the alternating voltage generated by the inverter circuit 600 increases or decreases the time width T of each half wave of the square-wave voltage to supply to the compressor 100, as shown in FIG. 2. That is, a variable zero voltage period corresponding to the time width T' in the figure is provided, whereby the variable time width T' is controlled to control the supply of energy to the compressor 100.

Figure 3A:
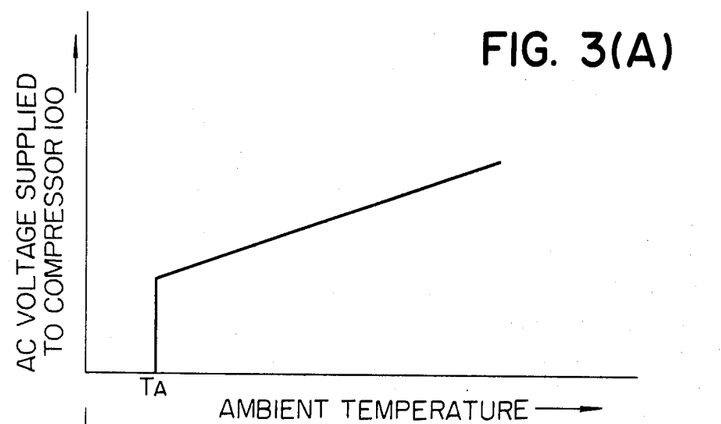
Figure 3B:
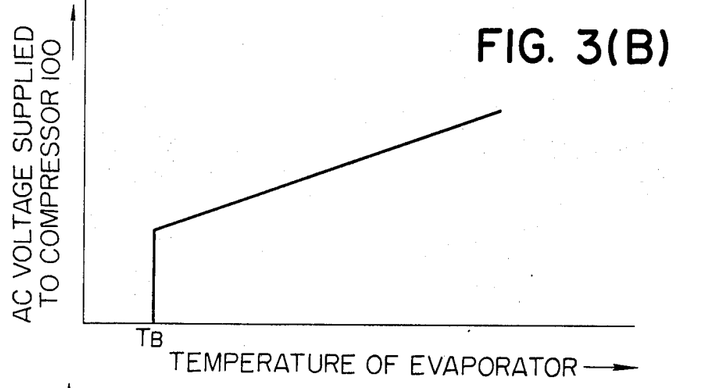
Figure 3C:
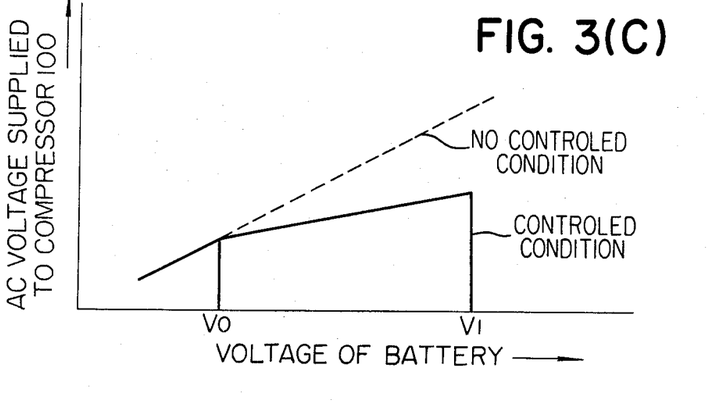

FIGS. 3 (A), (B) and (C) shows the characteristics of the alternating voltage supplied to the vibrating compressor 100 according to this invention. In this invention, the phase control of the abovementioned alternating voltage is effected.

(1) in accordance with ambient temperature to obtain the alternating voltage-ambient temperature characteristic as shown in FIG. 3 (A), (2) in accordance with the evaporator temperature to obtain the alternating voltage-evaporator temperature characteristic as shown in FIG. 3 (B), and (3) in accordance with the battery voltage to obtain the alternating voltage-battery voltage characteristic as shown in FIG. 3 (C).

That is, (1) When the phase control of the alternating voltage is effected in accordance with ambient temperature, the alternating voltage level is lowered as ambient temperature drops, and the alternating voltage is maintained at zero level as long as ambient temperature is lower than a predetermined temperature value $T_A$, as shown in FIG. 3 (A).

(2) When the phase control of the alternating voltage is effected in accordance with the evaporator temperature, the alternating voltage level is lowered as the evaporator temperature drops, and the alternating voltage is maintained at zero level as long as the evaporator temperature remains lower than a predetermined temperature value $T_B$, as shown in FIG. 3 (B).

(3) When the phase control of the alternating voltage is effected in accordance with the battery voltage, the rate of increase of the alternating voltage level with respect to the rise of the battery voltage is kept lower than that without phase control as long as the battery voltage remains more than a first predetermined voltage value $V_O$ and less than a second predetermined voltage value $V_1$, and the alternating voltage is maintained at zero level as long as the battery voltage remains higher than the second voltage value $V_1$, as shown in FIG. 3 (C).

When effecting the phase control of the alternating voltage according to this invention, any one or two in combination of the abovementioned phase control methods can be employed.

Figure 4:
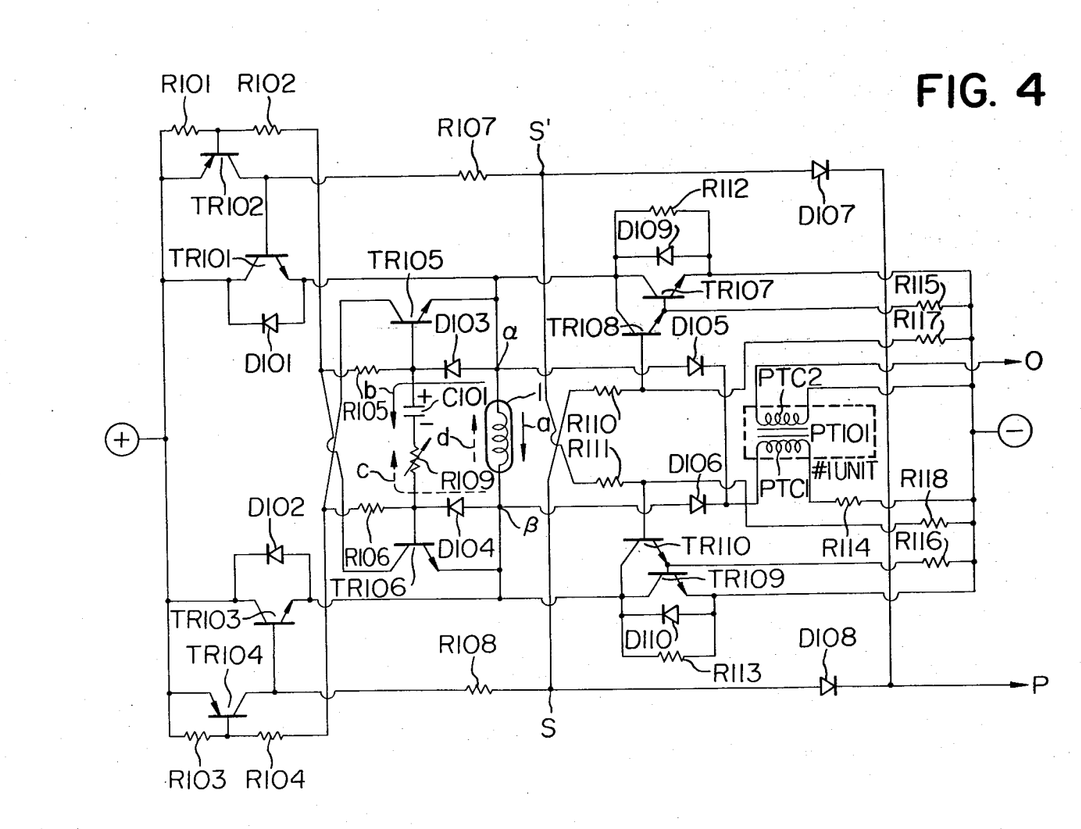
FIGS. 4 and 5 are explanatory drawings illustrating the circuit configuration and circuit operation of an inverter circuit for driving the vibrating compressor according to this invention, respectively.

FIG. 4 shows the circuit configuration of an inverter circuit according to this invention. In the figure, numeral 1 refers to a driving coil of the vibrating compressor 100; and unit #1 refers to a switching detecting circuit portion comprising a pulse transformer, for example. TR101, TR102, TR103, TR104, TR107, TR108, TR109, TR110 refer to main semiconductor elements with control portions, for example, transistors. Transistors TR101, TR102 and transistors TR109, TR110 form a pair and transistors TR103, TR104 and transistors TR107, TR108 form another pair, each pair alternately repeating on-off operations. TR105 and TR106 are transistors for controlling the base current of the transistor TR104 and the base current of the transistor TR102, respectively. C101 refers to a capacitor; D101 through D110 to diodes; R101 through R118 to resistors; PT101 to a pulse transformer; PTC1 to a primary winding of the pulse transformer PT101; and PTC2 to a secondary winding of the pulse transformer PT101, respectively. Points O and P in the right of the figure are connected to points O and P in FIG. 8. This circuit configuration of the inverter circuit is substantially the same as is shown in FIG. 5 of U.S. Pat. No. 4,179,899, issued to the assignee of the present invention, with the exception of the diode D105, the diode D106, the diode 107, the diode 108 and the pulse transformer PT101. The operation of the circuit will be described in what follows.

(I) Assume that the voltage of a d-c power supply is applied to the inverter circuit 600 in the polarity shown in the figure, and the vibrating compressor 100 is in steady-state operation, the transistors TR101, TR102, TR109 and TR110, for example, remaining in saturated operation region and being maintained in on state, and the transistors TR103, TR104, TR107 and TR108 remaining in cut-off region and being maintained in off state. In this state (hereinafter referred to as state A), a closed circuit is formed from the positive terminal of the d-c power supply to the negative terminal of the d-c power supply via the transistor TR101, the driving coil 1 and the transistor TR109, causing drive current to flow in the driving coil 1 in the direction shown by an arrow a in the figure. In the state A, a current flowing in the direction shown by an arrow b in the figure from one terminal $\alpha$ of the driving coil 1 in the figure via the diode D103, the capacitor C101 and the variable resistor R109 is supplied to the base of the transistor TR106. This base current has a waveform corresponding to the time constant determined by the capacitance of the capacitor C101 and the resistance of the circuit (the resistance value of the variable resistor R109 and other circuit elements), and at the same time determines the base current of the transistor TR101.

(II) As the transistor TR101 gets to satisfy the switching-off condition, that is, $$I_c \leq h_{FE} I_B$$

(where $I_c$: collector current, $I_B$: base current, $h_{FE}$: current amplification factor), then the voltage drop between the emitter and collector of the transistor TR101 sharply increases, decreasing the potential of the point $\alpha$ in the figure. At the same time, the voltage drop between the collector and emitter of the transistor TR109 sharply increase, causing the potential of the point $\beta$ in the figure to rise. This brings the terminal voltage level of the driving coil 1 to almost zero, causing the drive current supplied to the driving coil 1 to be suddenly cut off. Furthermore, the charging current of the capacitor C101 is suddenly cut off, turning off the transistor TR106. Then, the transistors TR102 and TR101 are completely brought to off state, and at the same time, the transistors TR109 and TR110 are completely turned off. The voltage drop at the point α in the figure and the voltage rise at the point β in the figure cause the current flowing in the primary winding PTC1 of the pulse transformer PT101 to be abruptly cut off. This current change induces a negative pulse voltage in the secondary winding PTC2. As the negative pulse voltage is induced, the voltage at the point P is reduced to the level of the negative terminal voltage of the d-c power supply and maintained at that level during the period of a variable time width, as will be described later, referring to FIG. 8. This variable time width corresponds with the time width T' in FIG. 2.

(III) During the period of the aforementioned variable time width T', the base potential of the transistor TR108 is maintained at almost the same level as that of the negative terminal potential of the d-c power supply, and therefore the transistors TR108, TR107 and the transistor TR103 are still maintained in off state. The transistors TR101, TR102 and the transistors TR109, TR110 are also maintained in off state. That is, the drive current fed to the driving coil 1 is kept in cut-off state. On the other hand, the capacitor C101 charged in the polarity shown in the figure starts discharging, causing discharge current to flow in the direction shown by an arrow c in the figure, maintaining the transistor TR105 in on state. This causes the transistor TR104 to be maintained in on state.

(IV) After the lapse of the period of the variable time width T', the point P in the figure and the negative terminal of the d-c power supply are returned to open state, causing the potential of the point S in the figure to sharply increase, as will be described later, referring to FIG. 8. This causes the base potential of the transistor TR108 to sharply increase, turning on the transistor TR108. Then, both the transistor TR107 and the transistor TR103 are turned on. With this, the potential of the point β in the figure sharply increases to almost the same potential as that of the positive terminal voltage of the d-c power supply, and at the same time, the potential of the point α in the figure sharply decreases to almost the same potential as that of the negative terminal of the d-c power supply. Consequently, a drive current flowing in the direction shown by an arrow d in the figure is supplied to the driving coil 1. A relatively large charging current flowing in the direction shown by an arrow c in the figure is supplied to the capacitor C101, bringing the transistor TR105 completely to on state, then turning on the transistors TR103, TR104, TR107 and TR108. The transistors TR103, TR104, TR107 and TR108 are maintained in on state and the other transistors TR101, TR102, TR109 and TR110 in off state, and the drive current continues to flow to the driving coil 1 in the direction shown by an arrow d in the figure until the transistor TR103 gets to satisfy the abovementioned switching-off condition.

(V) Once the transistor TR103 satisfies the switching-off condition, the transistors TR103, TR104, TR107 and TR108 are turned off. Then, the same circuit operation as described in (II) and subsequent paragraphs above is effected, and the drive current fed to the driving coil 1 is maintained in cut-off state during the period of the abovementioned variable time width T' starting from the switching-off time. The same operation is thereafter repeated, and the alternating voltage as shown in FIG. 2 is applied to the driving coil 1.

Figure 5:
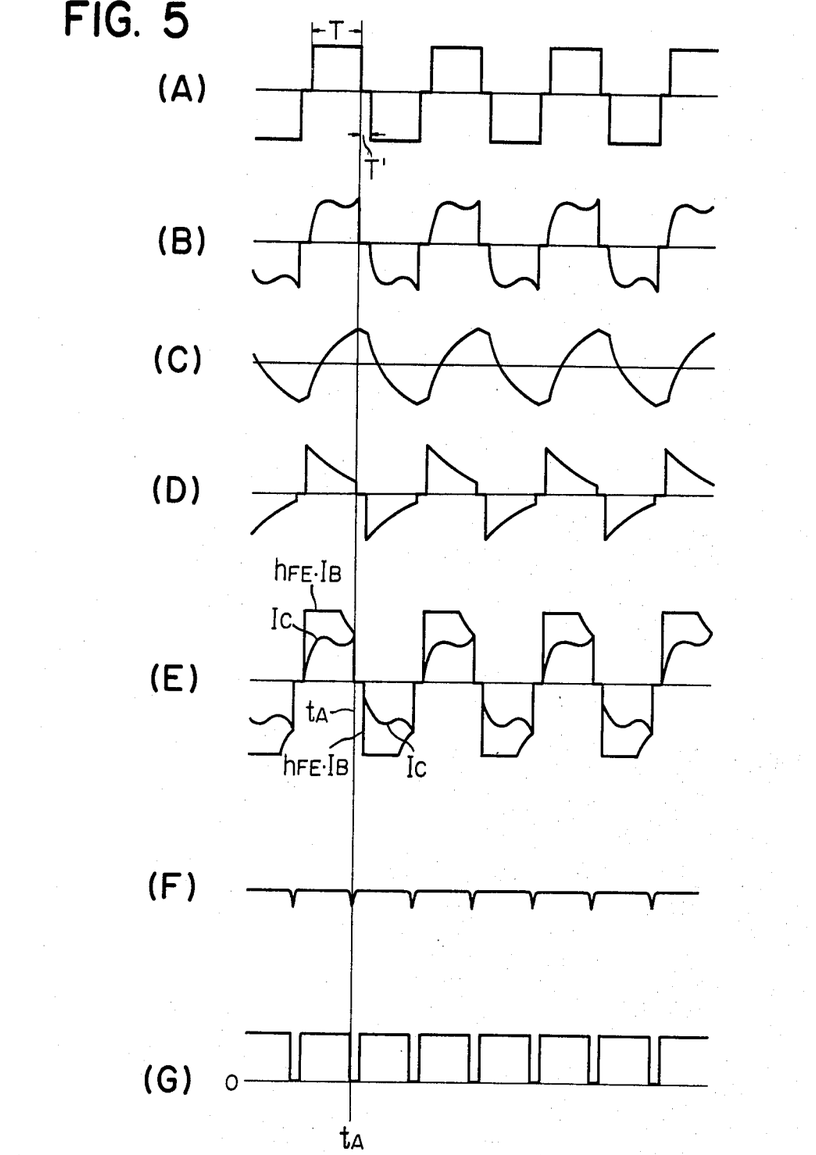

FIGS. 5(A) through (G) shows the operation of the inverter circuit shown in FIG. 4. The inverter circuit fundamentally acts so as to change the oscillation frequency of the alternating voltage in accordance with changes in the natural oscillation frequency of a mechanical system of the compressor. This is based on a function of the construction which includes the condenser C101 and the resistance R109 connected in parallel to the driving coil 1 through diodes D103 and D104, and the transistors TR105 and TR106. The operation and construction of this circuit is specified in the previously identified U.S. Pat. No. 4,179,899, especially FIGS. 4A-4F, 5 and 6A-6D thereof. The reason for the operation is briefly considered because the transistors TR101 or TR103 switches under the above condition $$I_C \geq h_{FE} I_B$$

and the waveform of the current $I_C$ represents the natural oscillation of the mechanical system of the compressor while the waveform of the current $I_B$ represents the oscillation of the alternating voltage. FIG. 5(A) shows a waveform of the voltage applied across the terminals of the driving coil 1, FIG. 5(B) a waveform of the drive current of the driving coil 1, FIG. 5(C) a waveform of the charging voltage of the capacitor C101, FIG. 5(D) a waveform of the charging current of the capacitor C101, FIG. 5(E) a current waveform indicating the switching operation of the transistor TR101 and the transistor TR103, FIG. 5(F) a waveform of the negative pulse voltage selected from the pulse voltages induced in the secondary winding PTC2 of the pulse transformer PT101, FIG. 5(G) a synthesized voltage waveform at the points S and S' in FIG. 4, that is, the voltage at the point P, respectively. $t_A$ in the figure corresponds with the switching time at which the transistor TR101 or the transistor TR103 satisfies the abovementioned switching-off condition.

Figure 6:
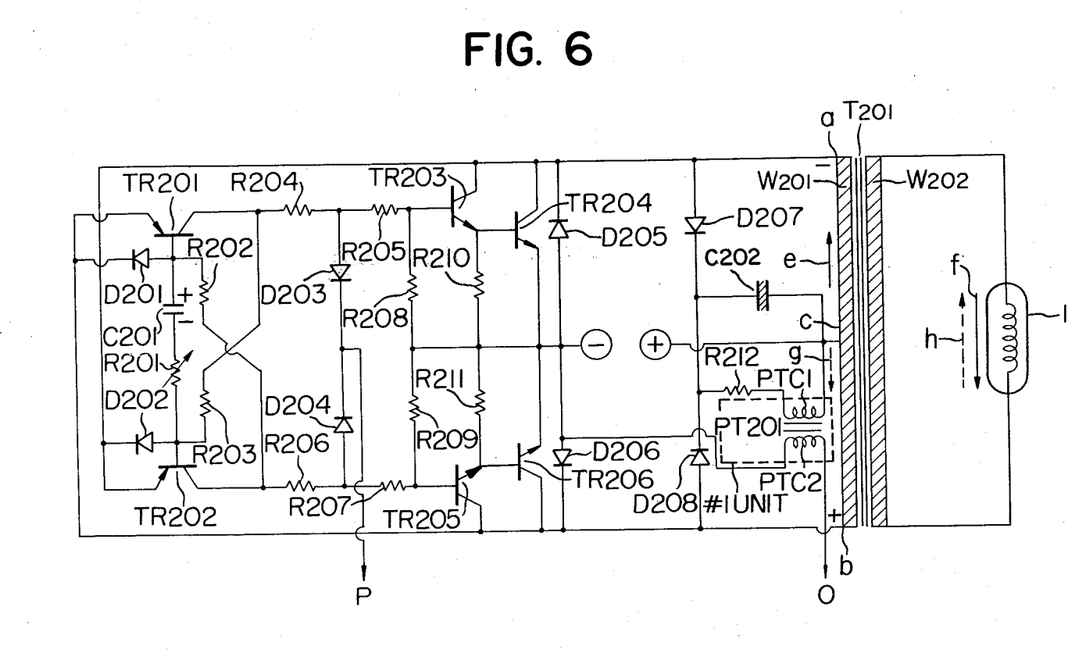
FIGS. 6 and 7 shows other examples of the inverter circuit according to this invention.

FIG. 6 shows the circuit configuration of another inverter circuit according to this invention. In the figure, TR201 through TR206 refer to transistors. As will be described later, the transistor TR201 and the transistor TR202 control the base current of the transistor TR203 and the base current of the TR205, respectively, and the transistors TR203, TR204 and the transistors TR205, TR206 alternately perform switching operation to control the current flowing in the primary winding W201 of the transformer T201. T201 refers to a transformer; W201 to a primary winding of the transformer T201; W202 to a secondary winding of the transformer T201 to which the driving coil 1 is connected; unit #1 to a switching detecting circuit portion comprising a pulse transformer PT201, for example; PTC1 to a primary winding of the pulse transformer PT201; PTC2 to a secondary winding of the pulse transformer PT201; C201 and C202 to capacitors; R201 to a variable resistor; R202 through R212 to resistors; D201 through D208 to diodes; 1 to a driving coil, respectively. Points O and P are connected to the points O and P in FIG. 8. The circuit operation will be described in the following.

(VI) Assume that the voltage a d-c power supply is applied to the inverter circuit 600 in the polarity shown in the figure, and the compressor 100 is in steady-state operation, and that the transistors TR203, TR204 are in saturated operation region and maintained in on state whereas the transistors TR205, TR206 are in cut-off region and maintained in off state. In this state (hereinafter referred to as state A), a closed circuit is formed from the positive terminal of the d-c power supply in the figure to the negative terminal of the d-c power supply via the upper half of the primary winding W201 of the transformer T201 and the transistor TR204, causing a primary current to flow in the upper half of the primary winding W201 of the transformer T201 in the direction shown by an arrow e in the figure. The primary current flowing in the direction shown by the arrow e in the figure induces a voltage in the secondary winding W202 of the transformer T201, causing a drive current to flow in the driving coil 1 in the direction shown by an arrow f in the figure. Furthermore, in the state A, a voltage twice as large as the voltage of the d-c power supply is generated across the terminals a and b of the primary winding W201 of the transformer T201 in the polarity shown in the figure. This voltage generated across the terminals a and b in the polarity shown in the figure causes a current to flow in a closed circuit (hereinafter referred to as circuit A) from the terminal b of the primary winding W201 via the emitter of the transistor TR201 as shown in the left of the figure, the base of the transistor TR201, the capacitor C201, the variable resistor R201, the diode D202 and the terminal a of the primary winding W201 to the terminal b of the primary winding W201. This current causes the transistor TR201 to be maintained in on state and causes the collector current of the transistor TR201 to be fed to the base of the transistor TR203 to maintain the transistor TR203 in on state, thus causing the transistor TR204 to be maintained in on state. The current flowing in the circuit A is determined by the time constant determined by the capacitance of the capacitor C201 and the circuit resistance (the resistance of the variable resistor R201 and other circuit elements).

(VII) As the transistor TR204 gets to satisfy the abovementioned switching-off condition, the voltage drop between the collector and emitter of the transistor TR204 is sharply increased and the voltage applied to the upper half of the primary winding W201 to the transformer T201 is reduced to almost zero level. This causes the drive current flowing in the driving coil 1 in the direction shown by an arrow f in the figure to be cut off. With a sharp increase in the voltage drop between the collector and emitter of the transistor TR204, the primary current flowing in the upper half of the primary winding W201 of the transformer T201 is sharply reduced. This causes a voltage to be induced in the primary winding W201 in the polarity opposite to that shown in the figure, whereby a current instantaneously flows in the primary winding PTC1 of the pulse transformer PT201. This current change induces a negative pulse voltage in the secondary winding PTC2, causing the potential at the point P in the figure to drop to the negative terminal voltage of the d-c power supply to maintain this state during the period of the variable time width T', as in the case of the embodiment shown in FIG. 4.

(VIII) During the period of the variable time width T', the transistors TR201, TR203, TR204 are maintained in off state, the other transistors TR205, TR206 are still maintained in off state, and the drive current fed to the driving coil 1 is maintained in cut-off state. In this state, the transistor TR202 can be regarded as being maintained in on state.

(IX) After the lapse of the period of the variable time width T', the point P in the figure and the negative terminal of the d-c power supply are returned to open state, whereby the potential at the point P in the figure is increased, which will be described later, referring to FIG. 8. This causes the collector current of the transistor TR202, which has been flowing to the negative terminal of the d-c power supply via the resistor R206, the diode D204 and the point P in the figure, to flow in the base of the transistor TR205 via the resistor R206 and the resistor R207. With this, the transistor TR205 is turned on, and then, the transistor TR206 is turned on, whereby a current begins to flow in a closed circuit from the positive terminal of the d-c power supply via the lower half of the primary winding W201 of the transformer T201 and the transistor TR206 to the negative terminal of the d-c power supply. That is, the primary current flow in the lower half of primary winding W201 of the transformer T201 in the direction shown by an arrow g in the figure. This causes a drive current to flow in the driving coil 1 in the direction shown by an arrow h in the figure. The drive current flowing in the direction shown by the arrow h continues to flow in the driving coil 1 until the transistor TR206 satisfies the abovementioned switching-off condition.

(X) As the transistor TR206 gets to satisfy the switching-off condition, the transistors TR202, TR205, TR206 are turned off and the same circuit operation as described in (VII) and subsequent paragraphs is effected. Thus, the drive current fed to the driving coil 1 is maintained in cut-off state during the period of the variable time width T' starting from the switching-off time. The same operation is thereafter repeated, and the alternating voltage as shown in FIG. 2 is applied to the driving coil 1.

Figure 7:
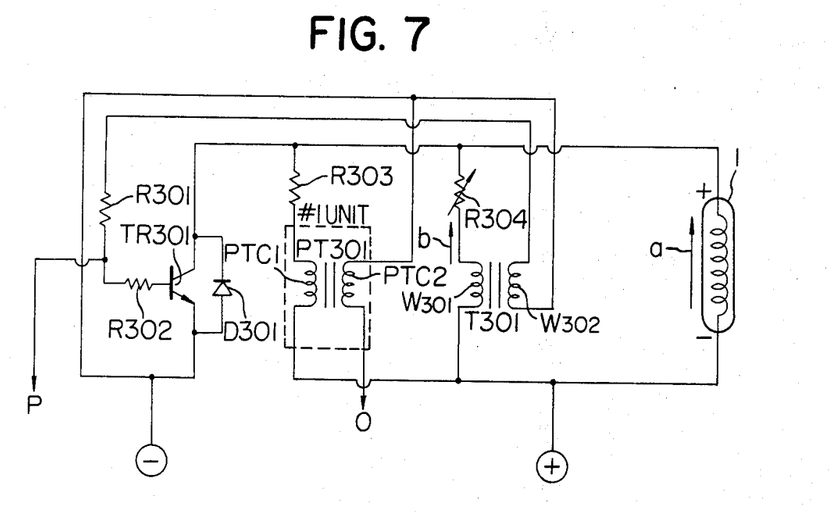

FIG. 7 shows the circuit configuration of another inverter circuit according to this invention. In the figure, TR301 refers to a transistor; T301 to a transformer; W301 to a primary winding of the transformer T301; W302 to a secondary winding of the transformer T301; unit #1 to a switching detecting circuit portion comprising a pulse transformer PT301, for example; PTC1 to a primary winding of the pulse transformer PT301; PTC2 to a secondary winding of the pulse transformer PT301; R301 through R303 to resistors; R304 to a variable resistor; D301 to a diode; 1 to a driving coil, respectively. Points O and P in the figure are connected to the point O and P in FIG. 8. The circuit operation will be described in the following.

(XI) Assume that the voltage of a d-c power supply is applied to the inverter circuit 600 in the polarity shown in the figure and the compressor 100 is in steady-state operation, and that the transistor TR301 is maintained in saturated operation region, or in on state. In this state (hereinafter referred to as state A), a closed circuit is formed from the positive terminal of the d-c power supply via the driving coil 1 and the transistor TR301 to the negatibe terminal of the d-c power supply, causing a drive current to flow in the driving coil 1 in the direction shown by an arrow a in the figure. In the state A, a current flows in a series circuit of the primary winding W301 of the transformer T301 and the variable resistor R304 in the direction shown by an arrow b in the figure, inducing in the secondary winding W302 of the transformer T301 a voltage forward-biasing the base-emitter potential of the transistor TR301.

(XII) As the transistor TR301 gets to satisfy the abovementioned switching-off condition, the transistor TR301 is shifted from the saturated operation region to the active operation region, and thereby the voltage drop across the collector and emitter increases. With an increase in the voltage drop across the collector and emitter, the voltage applied to the primary winding W301 of the transformer T301 decreases, the voltage induced in the secondary winding W302 of the transformer T301 decreases, and the base current of the transistor TR301 also decreases. This causes the transistor TR301 to rapidly shift to off state, and the drive current fed to the driving coil 1 is sharply decreased to cut-off state.

(XIII) When the drive current flowing in the direction shown by the arrow a in the figure is cut off, a voltage is induced across the terminals of the driving coil 1 in the polarity shown in the figure. The reason for this is as follows. That is, while a drive current flows in the driving coil 1 in the direction shown by the arrow a in the figure, causing the driving coil 1 to move, mechanical energy is accumulated in a resonating coil spring (not shown), for example, of the compressor with the movement of the driving coil 1. When the drive current flowing in the driving coil 1 is interrupted to stop the movement of the driving coil 1, the driving coil 1 is moved in the opposite direction in the magnetic field of the vibrating compressor by the energy accumulated in the resonating coil spring. With the movement of the driving coil 1, a voltage is induced across the terminals of the driving coil 1.

(XIV) During the period when a voltage is induced across the terminals of the driving coil 1 in the polarity shown in the figure, a current flows in a series circuit comprising the primary winding W301 of the transformer T301 and the variable resistor R304 in the direction opposite to the direction shown by the arrow b in the figure, inducing in the secondary winding W302 of the transformer T301 a voltage reverse-biasing the base-emitter potential of the transistor TR301, and thereby the transistor TR301 is maintained in off state.

(XV) Upon completion of the movement of the driving coil 1 in the opposite direction, the voltage induced across the terminals of the driving coil 1 disappears, and the transistor TR301 is turned on by a leak current flowing in the transistor TR301. However, simultaneously with the turning-on of the transistor TR301, a negative pulse voltage is generated in the secondary winding PTC2 of the pulse transformer PT301, whereby the voltage at the point P in the figure is reduced to the negative terminal voltage of the d-c power supply and maintained at that level during the period of the variable time width. That is, the transistor TR301 is still maintained in off state even after completion of the movement of the driving coil 1.

(XVI) After the lapse of the period of the variable time width, the voltage at the point P in the figure increases, turning on the transistor TR301. The transistor TR301 is maintained in on state until the abovementioned switching-off condition is satisfied, and the drive current is fed to the driving coil 1 in the direction shown by the arrow a in the figure. The same operation is thereafter repeated to drive the compressor.

Figure 8:
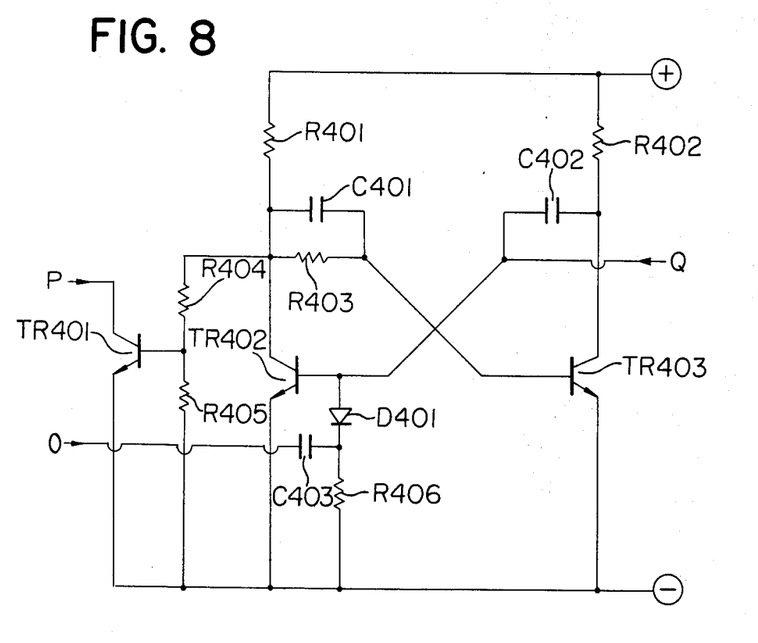
FIG. 8 shows the circuit configuration of an example of the control current controlling circuit portion of the phase control circuit according to this invention.

FIG. 8 shows the circuit configuration of a control current controlling circuit portion according to this invention. In the figure, TR401, TR402 and TR403 refer to transistors; C401, C402 and C403 to capacitors; D401 to a diode; R401 through R406 to resistors, respectively. Points O and P in the figure are connected to the points O and P in FIGS. 4, 6 and 7, and point Q in the figure is connected to the point Q in FIG. 9.

In FIG. 8, the transistors TR402, TR403, the capacitors C401, C402, C403, the diode D401, and the resistors R401, R402, R403, R406 comprise a one-shot multivibrator. In stable state, the transistor TR402 is maintained in on state and the transistor TR403 in off state. In this state, the base current of the transistor TR402 is fed from a circuit portion shown in FIG. 9, which will be described later, via the point Q in the figure. When a negative pulse voltage is generated in the secondary winding PTC2 of the pulse transformer PT101, PT201 or PT301 in FIGS. 4, 6 or 7 and applied to the point O in the figure, the transistor TR402 is turned off whereas the transistor TR403 is turned on. This causes the current fed to the base of the transistor TR402 via the point Q in the figure to bypass from the point Q to the collector of the transistor TR403 via the capacitor C402. As the charge current of the capacitor C402 exceeds the base voltage cutoff level of the transistor TR402, the transistor TR402 is turned on whereas the transistor TR403 is turned off. The time width in which the transistor TR402 is maintained in off state is variable, determined by the level of the current flowing in the point Q in the figure and the capacitance of the capacitor C402, and has a decreasing tendency with increase in the abovementioned current level. As is evident in the figure, the transistor TR401 is turned off when the transistor TR402 is in on state, and turned on when the transistor TR402 is in off state. For this reason, when a negative pulse voltage is applied to the point O in the figure, the transistor TR401 is turned on and maintained in on state until the transistor TR402 is turned on, causing the point P in the figure to maintain at almost the same potential as the negative terminal voltage of the d-c power supply.

Figure 9:
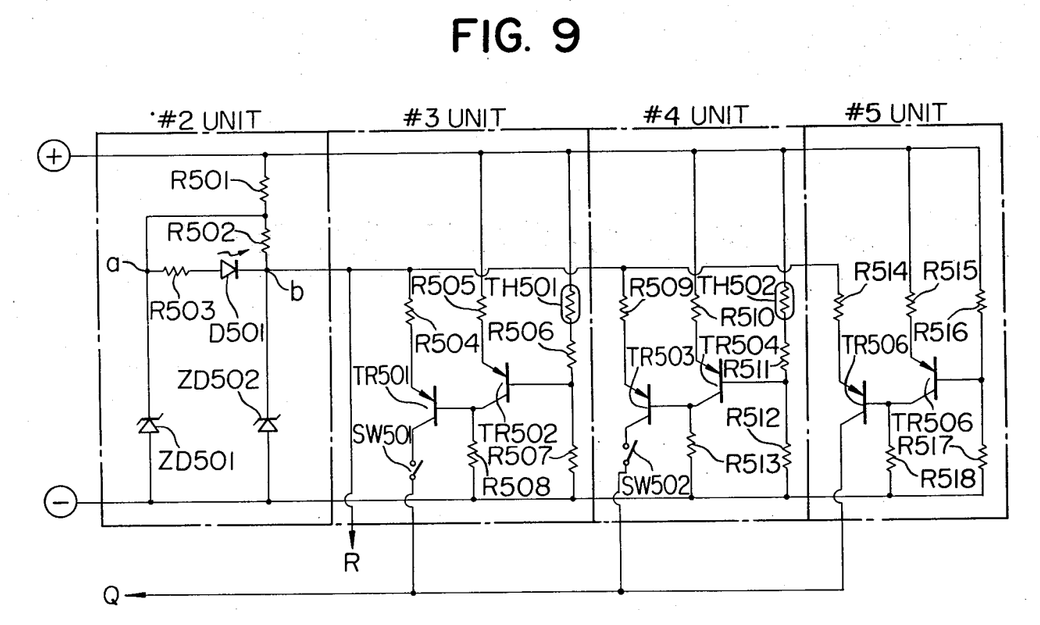
FIG. 9 shows the circuit configuration of an example of the temperature sensing circuit portion, voltage detecting circuit portion and off-operation indicating circuit portion of the phase control circuit.

FIG. 9 shows the circuit configuration of a temperature sensing circuit portion, a voltage detecting circuit portion and an off operation indicating circuit portion according to this invention. In the figure, unit #2 refers to an off operation indicating circuit portion; unit #3 to an evaporator temperature sensing circuit portion; unit #4 to an ambient temperature sensing circuit portion; unit #5 to a voltage detecting circuit portion; TR501 through TR506 to transistors; ZD501 and ZD502 to zener diodes; TH501 and TH502 to thermistors; D501 to a light emitting diode; SW501 and SW502 to switches; R501 through R518 to resistors, respectively. Point Q and R in the figure are connected to the point Q in FIG. 8 and the point R in FIG. 10, respectively.

The circuit portions as shown in FIG. 9 is capable of performing any one of the following four functions or performing simultaneously a plurality of functions among them.

(a) A function to indicate the non-operating state of the campressor by means of the off operation indicating circuit portion #2 in which the light emitting diode D501 is caused to light up when ambient temperature, for example, is less than a predetermined temperature value, as will be described later, referring to FIG. 10.

(b) A function to reduce the collector current of the transistor TR501 by means of the evaporator temperature sensing circuit portion #3 as the evaporator temperature decreases.

(c) A function to reduce the collector current of the transistor TR503 by means of the ambient temperature sensing circuit portion #4 as ambient temperature decreases.

(d) A function to reduce the collector current of the transistor TR505 by means of the voltage detecting circuit portion #5 as the voltage of the d-c power supply increases.

In the following, the circuit operations for each of the functions (a) through (d) will be described.

Circuit operation corresponding to function (a)

When the compressor 100 is in steady-state operation, the zener diode ZD501 of the off operation indicating circuit portion #2 is turned on to maintain the voltage at the point a in the figure at the zener voltage of the zener diode ZD501 whereas the other zener diode ZD502 is turned on to maintain the voltage at the point b in the figure at the zener voltage of the zener diode ZD502. In this state, the light emitting diode D501 is maintained in the extinguished state. As the voltage at the point R, or the voltage at the point b in the figure is reduced to the negative terminal voltage of the d-c power supply, as will be described later, referring to FIG. 10, the current flowing in the light emitting diode D501 is increased, causing the light emitting diode D501 to shift from the extinguished state to the lighting state. The light emitting diode D501 continues to light up until the voltage at the point R or the voltage at the point b is returned to the original voltage level. During the period when the voltage at the point R is reduced to the negative terminal voltage of the d-c power supply, the drive current to the driving coil 1 is in cut-off state for the reasons as will be described later, bringing the compressor 100 to non-operating state. In this manner, the off operation indicating circuit portion #2 acts as an indicator of the non-operating state of the compressor by means of the light emitting diode D501.

Circuit operation corresponding to function (b)

The thermistor TH501 of the evaporator temperature sensing circuit portion #3 is adapted to have a resistance value in accordance with the evaporator temperature and have such a characteristic that the resistance value increases as the evaporator temperature decreases. In a state where the switch SW501 is turned on, therefore, the resistance value of the thermistor TH501, the base circuit of the transistor TR502 and the collector current of the transistor TR502 are increased as the evaporator temperature decreases. This causes the base current and the collector current of the transistor TR501 to decrease. Thus, the current flowing in the point Q in the figure is decreased as the evaporator temperature decreases, causing the on period of the transistor TR401 in FIG. 8 to increase. That is, the power supplied to the compressor is decreased as the evaporator temperature decreases.

Circuit operation corresponding to function (c)

The thermistor TH502 of the ambient temperature sensing circuit portion #4 is adapted to have a resistance value in accordance with ambient temperature and have such a characteristic that the resistance value increases as ambient temperature decreases. In a state where the switch SW502 is maintained in the on state, therefore, the circuit operation of the ambient temperature sensing circuit portion #4 is almost the same as that of the abovementioned evaporator temperature sensing circuit portion #3, as is evident in the figure. That is, as ambient temperature decreases, the power supplied to the compressor is decreased.

Circuit operation corresponding to function (d)

In the voltage detecting circuit portion #5, as the voltage of the d-c power supply in the polarity shown in the figure increases, the base current and the collector current of the transistor TR506 are increased. This causes the base current and the collector current of the transistor TR505 to decrease. Thus the current flowing in the point Q in the figure is decreased as the voltage of the d-c power supply increases. That is, the rate of increase in the alternating voltage supplied to the driving coil 1 of the compressor is decreased as the voltage of the d-c power supply increases, as shown in FIG. 3 (C).

Figure 10:
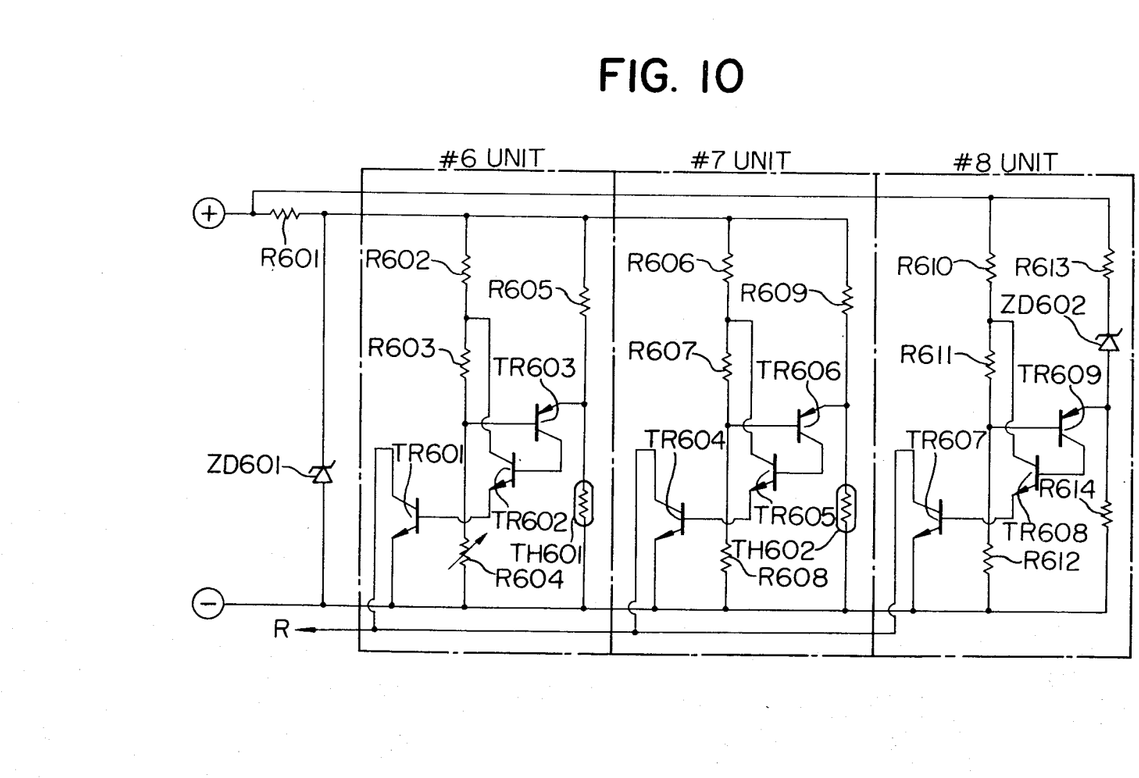
FIG. 10 shows the circuit configuration of an example of the low temperature sensing circuit portion and high voltage detecting circuit portion of the phase control circuit.

FIG. 10 shows the circuit configuration of a low temperature sensing circuit portion and a high voltage detecting circuit portion according to this invention. In the figure, unit #6 refers to an evaporator low temperature sensing circuit portion; unit #7 to an ambient low temperature sensing circuit portion; unit #8 to a high voltage detecting circuit portion; TR601 through TR609 to transistors; ZD601 and ZD602 to zener diodes; TH601 and TH602 to thermistors; R601 through R614 to resistors, respectively. Point R in the figure is connected to the point R in FIG. 9. (e) In the evaporator low temperature sensing circuit portion #6, the thermistor TH601 is adapted to have a resistance value in accordance with the evaporator temperature and have such a characteristic that the resistance value increases as the evaporator temperature decreases. The transistor TR603 is maintained in the off state when the resistance value of the thermistor TH601 is less than a predetermined value, and in the on state when the resistance value of the thermistor TH601 is more than the predetermined value. That is, the transistor TR603 is maintained in the off state when the evaporator temperature is above a predetermined temperature value (for example, temperature $T_B$ in FIG. 3 (B)), and in the on state when the evaporator temperature is below the predetermined temperature value, $T_B$. In a state where the evaporator temperature is above the predetermined temperature value, $T_B$, therefore, the transistors TR603, TR602 and TR601 are all maintained in the off state, and the potential at the point R in the figure, that is, the potential at the point b in FIG. 9 is maintained at a high level. On the other hand, when the evaporator temperature is below the predetermined temperature value, $T_B$, the transistor TR603 is turned on, and then the transistor TR602 and the transistor TR601 are successively turned on. This causes the potential at the point R in the figure, that is, the potential at the point b in FIG. 9 to decrease to almost the negative terminal voltage of the d-c power supply. Thus, the current that has been flowing in the transistor TR501, TR503 or TR505 in FIG. 9 is cut off and bypassed from the point b in FIG. 9 via the point R in the figure, the transistor TR601. Consequently, the transistor TR402 in FIG. 8 is maintained in the off state and the transistor TR401 in the on state, causing the power supply to the driving coil 1 to be interrupted. (f) In the ambient low temperature sensing circuit portion #7, the thermistor TH602 is adapted to have a resistance value in accordance with ambient temperature and have such a characteristic that the resistance value increased as ambient temperature decreases. The transistor TR606, the switching operation of which is controlled by the resistance value of the thermistor TH602, is maintained in the off state when ambient temperature is above a predetermined temperature value (for example, temperature value $T_A$ in FIG. 3 (A)), and is shifted to the on state when ambient temperature is below the temperature value, $T_A$. When ambient temperature becomes below the temperature value $T_A$, the same circuit operation as that of the abovementioned evaporator low temperature sensing circuit portion #6 is effected to discontinue the power supply to the driving coil 1.

(g) In the high voltage detecting circuit portion #8, when the voltage of the d-c power supply is below a predetermined voltage level (for example, the voltage level $V_1$ in FIG. 3 (C)), the zener diode ZD602 is maintained in the cut-off state, and the transistors TR609, TR608 and TR607 are also maintained in the off state. On the other hand, when the voltage of the d-c power supply becomes above the voltage level $V_1$, the zener diode ZD602 is conducting, and the transistors TR609, TR608 and TR607 are also shifted to the on state. This causes the power supply to the driving coil 1 to be interrupted.

Figure 11:
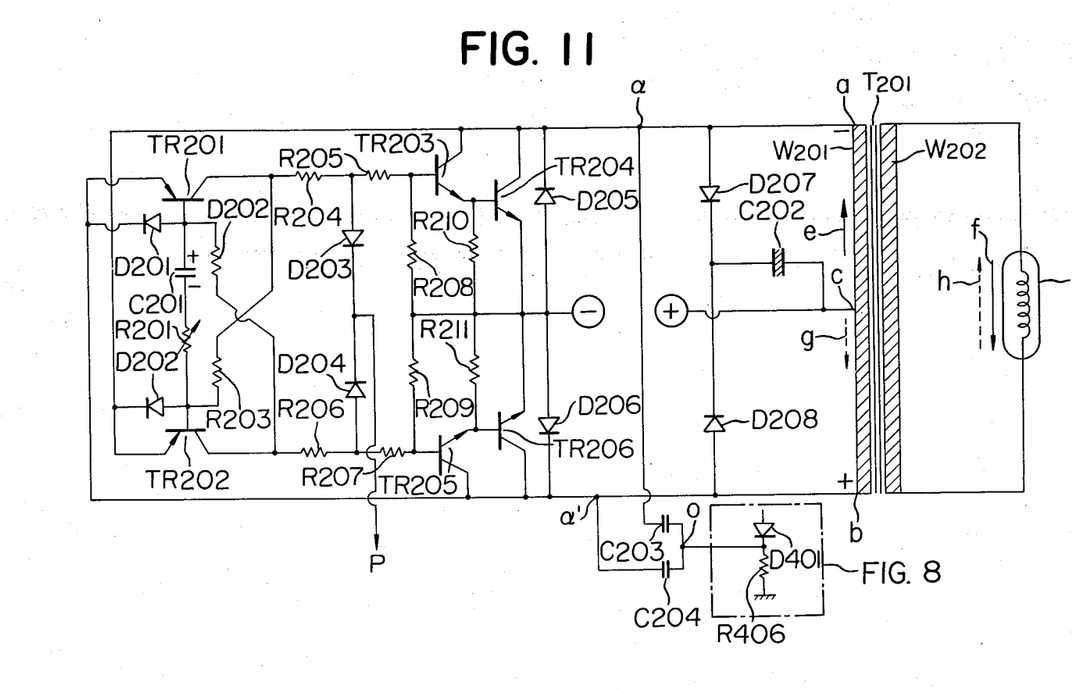
FIG. 11 shows an example of the switching detecting circuit portion of the inverter circuit.

FIG. 11 shows the circuit configuration of a switching detecting circuit portion in the inverter circuit according to this invention. In the figure, C203 and C204 refer to capacitors; D401 and R406 to the diode and the resistor in FIG. 8, respectively. Other numerals correspond with like numerals in FIG. 6.

The circuit operation of this embodiment is almost the same as that of the circuit shown in FIG. 6, except for the function to detect the switching operation of the transistors TR204 and TR206, which will be described in the following. That is, at the moment when the transistor TR204, for example, is turned off from the on state, the point b in the figure becomes a negative potential almost twice as large ($-2$ V) as the voltage of the d-c power supply, or V due to the transient phenomenon in the transformer T201. That is, the potential of the point $\alpha'$ in the figure instantaneously becomes negative, and the negative pulse voltage is applied to the point O in the figure via the capacitor C204, initiating the operation of the one-shot multivibrator as described, referring to FIG. 8.

In summary, the present invention is shown to include an inverter circuit 600, shown in FIG. 4 and a phase control circuit shown in FIGS. 8, 9 and 10 which includes a control current controlling circuit portion, specifically shown in FIG. 8. There is also provided various units 2–5 shown in FIG. 9 which include the off operation indicating portion (UNIT 2), the evaporator temperature sensing circuit portion (UNIT 3), the ambient temperature sensing circuit portion (UNIT 4), and the voltage detecting circuit portion (UNIT 5). The circuit shown in FIG. 10 includes the evaporator low temperature sensing circuit portion (UNIT 6), the ambient low temperature sensing circuit portion (UNIT 7), and the high voltage detecting circuit portion (UNIT 8). There is also provided the DC power supply 800. The inverter circuit 600 is able to have any of the configurations shown in FIG. 4 including four transistors, FIG. 6 including two transistors, or FIG. 7 including one transistor. Furthermore, FIG. 11 shows another embodiment using the inverter circuit of FIG. 6.

The inverter circuit 600, as was described in the aforementioned patent, generates fundamentally an alternating voltage so as to charge the oscillation frequency of the alternating voltage in accordance with changes in the natural oscillation frequency of the mechanical system of the compressor. To synchronize the converter circuit 600 and the phase control circuit 700, the pulse transformer PT101 detects the timing of the switching transistors TR101 and TR103, and transfers this timing signal to the control circuit controlling circuit portion as shown in FIG. 8 by means of the terminal O. According to this timing signal, the control current controlling circuit portion as shown in FIG. 8 holds the point P to the negative terminal voltage during the period of time whose width T' is shown in FIG. 5A, so as to suppress the operation of the inverter circuit 600. The outputs of each of the UNITS 3–UNIT 5 act so as to change the time width T', by means of the terminal Q. The outputs of the units 6–8 are transferred to UNITS 3–5 through a terminal R. That is to say, the output of unit 2 is held to the negative. Therefore, the outputs of units 3–5 are also held to the negative. As a result, the operation of the inverter circuit 600 is suppressed.

As described above, this invention makes it possible to prevent unwanted damage to the valve chest due to temperature drop by controlling the phase of the alternating voltage supplied to the compressor in accordance with ambient temperature and/or the evaporator temperature so as to reduce the piston stroke in accordance with a drop in ambient temperature and/or evaporator temperature. In addition, the invention makes it possible to reduce a loss in electrical energy, compared with the system of controlling the amplitude of the alternating voltage, by controlling the phase of the alternating voltage supplied to the compressor.

What is claimed is:

1. A refrigerating device having an inverter circuit for generating an alternating voltage, a phase control circuit for controlling the switching phase in the inverter circuit, a vibrator compressor to which the alternating voltage from the inverter circuit is supplied, a condenser to which the refrigerant is fed from the vibrating compressor, a capillary tube provided on the downstream side of the condenser, an evaporator provided on the downstream side of the capillary tube, the inverter circuit having at least one main semiconductor element with a control portion and constructed so as to change the oscillation frequency of the alternating voltage in accordance with changes in the natural oscillation frequency of a mechanical system of the compressor, the phase control circuit having at least one of an ambient temperature sensor and an evaporator temperature sensor, wherein the phase control circuit supplies a control signal for the inverter circuit for controlling the phase of the alternating voltage supplied to the vibrating compressor in accordance with at least one of the ambient temperature and the evaporator temperature so as to lower the compression level of the refrigerant by reducing the piston stroke of the vibrating compressor in accordance with changes in at least one of the ambient temperature and the evaporator temperature.

2. A refrigerating device as set forth in claim 1 wherein the phase control circuit has a temperature sensing circuit portion for sensing ambient temperature and/or the temperature of the evaporator, a switching detecting circuit portion for detecting the switching timing of the main semiconductor elements and a control current controlling circuit portion for determining the duration of the supply of control current flowing in the control portion of the main semiconductor elements in accordance with the sensing signal level generated by the temperature sensing circuit portion, the control current controlling circuit portion being constructed so as to interrupt the supply of the control current during the period corresponding to the sensing signal level produced by the temperature sensing circuit portion from the point of time when the detection signal is generated by the switching detecting circuit portion; and the conduction period of the main semiconductor elements is controlled by the phase control circuit.

3. A refrigerating device as set forth in claim 2 wherein the phase control circuit has a low temperature sensing circuit portion for sensing a drop of ambient temperature and the evaporator temperature below a predetermined temperature level, and is constructed so as to maintain the alternating voltage supplied to the vibrating compressor at zero level during the period when ambient temperature and/or the evaporator temperature remain below a predetermined temperature level.

4. A refrigerating device as set forth in claim 3 wherein the phase control circuit has an operation indicating circuit portion for visually indicating the non-operating state of the compressor.

5. A refrigerating device as set forth in claim 1 wherein the phase control circuit has a voltage detecting circuit portion for detecting the magnitude of the voltage of the d-c power supply applied to the inverter circuit, a switching detecting circuit portion for detecting the switching timing of the main semiconductor elements and a control current controlling circuit portion for determining the period of supply of the control current flowing in the control portion of the main semiconductor elements in accordance with the detection signal level produced by the voltage detecting circuit portion; and the conduction period of the main semiconductor elements is controlled by the control current controlling circuit portion.

6. A refrigerating device as set forth in claim 5 wherein the phase control circuit has a high voltage detecting circuit portion for detecting a magnitude of the voltage of the d-c power supply above a predetermined voltage value, and is constructed so as to maintain the alternating voltage supplied to the vibrating compressor at zero level during the period when the voltage of the d-c power supply remain above the predetermined voltage value.

7. A refrigerating device as set forth in claim 6 wherein the phase control circuit has an operation indicating circuit portion for visually indicating the state non-operating of the compressor.

* * * * *